AUTOMATIC RECORD PLAYER

Filed March 28, 1967 3 Sheets-Sheet 1

*INVENTOR.*
MARVIN MINDELL
KARL RUDZITIS

INVENTORS
MARVIN MINDELL
KARL RUDZITIS

*INVENTOR.*
MARVIN MINDELL
KARL RUDZITIS

United States Patent Office 3,480,282
Patented Nov. 25, 1969

3,480,282

AUTOMATIC RECORD PLAYER

Marvin Mindell, Great Neck, Karl Rudzitis, West Babylon, N.Y., assignors to Viewlex, Inc., Holbrook, N.Y.

Filed Mar. 28, 1967, Ser. No. 626,533
Int. Cl. G11b *25/04, 25/06*
U.S. Cl. 274—9 6 Claims

ABSTRACT OF THE DISCLOSURE

An automatic record player wherein it is only necessary to lift a flap or control lever, slide a record into a slot, and close the flap. An internal carriage is connected to the flap so that when the flap is closed, the record is automatically placed on a spindle. The carriage is rotatably mounted and connected to the flap so that when the flap is closed, the carriage is rotated down and the record is gripped between a spindle and a pair of pressure wheels mounted on the carriage.

When the carriage is rotated down a rim drive wheel engages the rim of the record. The rim drive wheel is mounted on the control arm which controls a motor start switch for rotating the record. The rotation of the carriage also engages a tone arm with the record. The needle or other pickup of the tone arm then follows the grooves in the records towards the center part of the record. When the record is finished playing, the tone arm activates a stop switch which stops the rotation of the record. The flap is then raised, the record removed, and a new record put in.

This invention relates to record player means having a minimum of operating adjustments.

More particularly the invention provides an automatic record player wherein it is only necessary to lift a flap or control lever, slide a record into a slot, and close the flap. An internal carriage is connected to the flap so that when the flap is closed, the record is automatically placed on a spindle. The carriage is rotatably mounted and connected to the flap so that when the flap is closed the carriage is rotated down and the record is gripped between a spindle and a pair of pressure wheels mounted on the carriage.

Also when the carriage is rotated down a rim drive wheel engages the rim of the record. The rim drive wheel is mounted on the control arm which controls a motor start switch for rotating the record. The rotation of the carriage also engages a tone arm with the record. The needle or other pickup of the tone arm then follows the grooves in the record towards the center part of the record. When the record is finished playing, the tone arm activates a stop switch which stops the rotation of the record. The flap is then raised, the record removed, and a new record put in.

Accordingly, a principal object of the invention is to provide new and improved automatic record player means requiring a minimum of operating adjustments.

Another object of the invention is to provide new and improved record player means wherein it is only necessary to open a flap and slide a record into a slot.

Another object of the invention is to provide new and improved record player means having a slot adapted to receive a record, a flap adapted to cover said slot, an internal rotatable control carriage adapted to receive said record, said flap being connected to operate said carriage.

Another object of the invention is to provide new and improved record player means which are tamper proof and can stand rough handling and suitable for and used by school age children.

Another object of the invention is to provide new and improved portable record player means which will play in any position, even upside down.

These and other objects of the invention will be apparent in the following specification and drawings of which:

Referring to the figures, the case C has a slot 20 which is adapted to be covered by the flap 1. The flap 1 is pivotally mounted by the pin 1'. Alternatively a control lever which does not cover the slot may be used. A rotatable carriage 2 is pivotally mounted on pin 2' and is adapted to receive the record through a slot 20, when in the open position illustrated in FIGURE 5. Fixedly connected to the flap 1 is a member 1A having pin 1B which is adapted to ride under the cam 4 which is connected to the carriage 2, so that when the flap is opened as in FIGURE 5, the carriage 2 is cammed to the open position.

Figure 2:
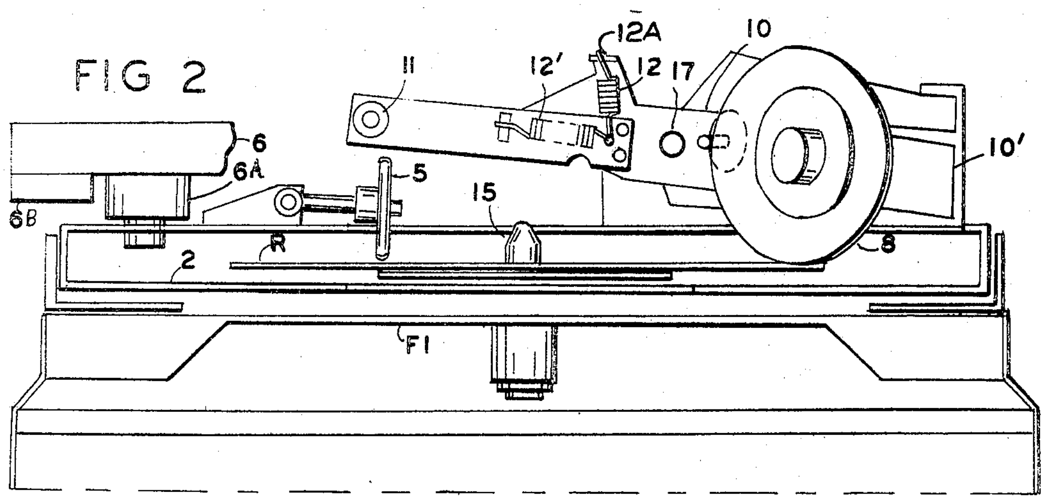
FIGURE 2 is a front view of the embodiment of FIGURE 1 with the case removed.
Figure 1:
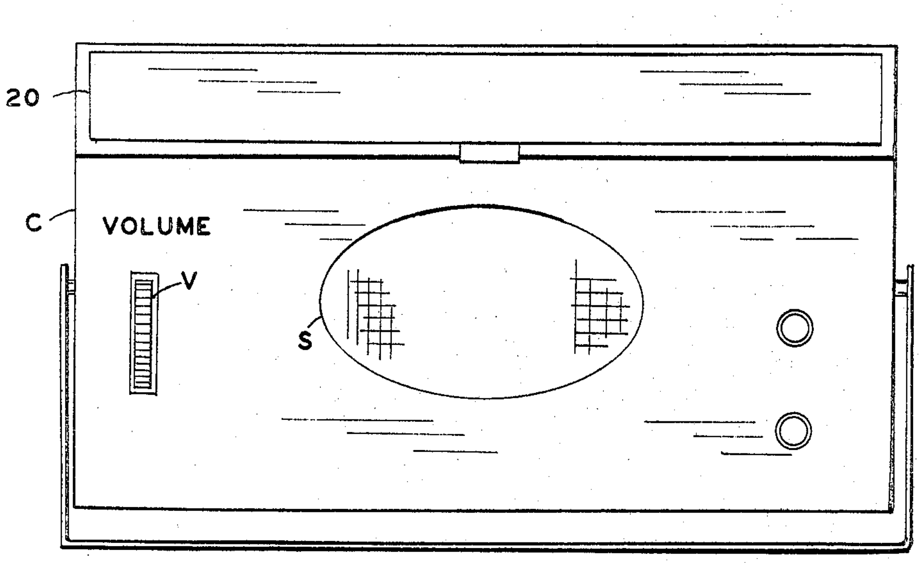
FIGURE 1 is a front view of the embodiment of the invention.

FIGURE 2 shows the carriage 2 in a down position and shows a record R resting on the spindle 15 which is freely rotatably mounted on the frame member F1. When the carriage 2 is in the down position the record is lifted off the bottom of the carriage by the spindle which extends through an aperture in the carriage.

Mounted on the carriage are two spring loaded pressure wheels 5 and 5' which engage the record between them and the spindle 15, when the carriage is in the down position. An alternate design places one wheel on the centerline connecting it and wheel 8 to provide support without restriction for the record.

Also mounted on the carriage is motor 7 having a shaft 7'. A control arm 10 is pivotally mounted on the carriage by means of the pin 17 and a suitable bracket. The arm 10 has a counter weight 11. A rim drive wheel 8 is rotatably mounted on the arm.

As the carriage 2 moves down then the record comes in contact with the wheel 8 and causes the arm 10 to rotate counter clockwise in FIGURE 2. When this happens the cam 10' on the arm 10 engages the switch 9 closing its contacts 9A and 9B.

Figure 7:
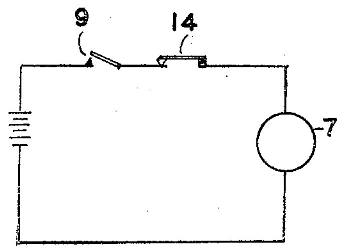
FIGURE 7 is a circuit diagram.

Referring to FIG. 7 the switch 9 is a normally open motor starting switch which is connected to start the motor 7 through normally closed stop switch 14, and cause the motor to rotate. In the carriage down position wheel 8 engages the top surface rim of the record to turn it. The wheel 8 also engages the motor shaft 7' when in carriage down position. An optional design may have a second wheel 8' beneath the record directly below the wheel 8 to provide support for the record when wheel 8 bears against the record.

The tone arm 6 is rotatably mounted on the carriage 2 by means of the mounting 6A and is counterweighted by the weight 6B. The tone arm has a conventional pickup 13 pivotally mounted on the arm. When the carriage 2 is in the down position then the tone arm engages the grooves of the record R in conventional manner. The pickup is connected to the conventional amplifier A the output of which is connected to speaker S. The amplifier A has a volume control V which is the only adjustment which has to be made. Motor stop switch 14 is mounted on the carriage and is adapted to be actuated the tone arm 6 when the tone arm 6 has moved to the center of the record and the record is completed. The motor stop switch is connected to conventional motor control which is arranged to stop the motor 7.

The motor 7 is adapted to be driven by batteries B1 and B2 for portable operation. If desired another power supply could be substituted for different voltage inputs.

As a result of the completely portable operation and in fact that the record is held between the spindle and the pressure wheels, this record player will operate in any position, even upside down.

DETAILED DESCRIPTION OF OPERATION

Figure 5:
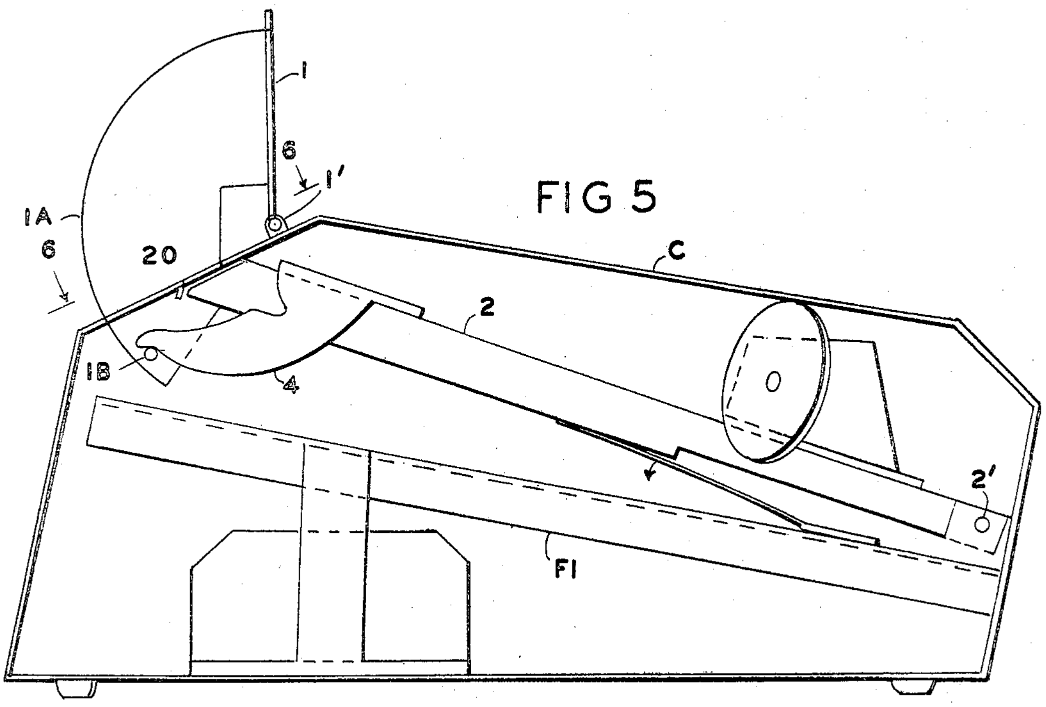
FIGURE 5 is a right side view of FIGURE 3, with side casings removed.
Figure 4:
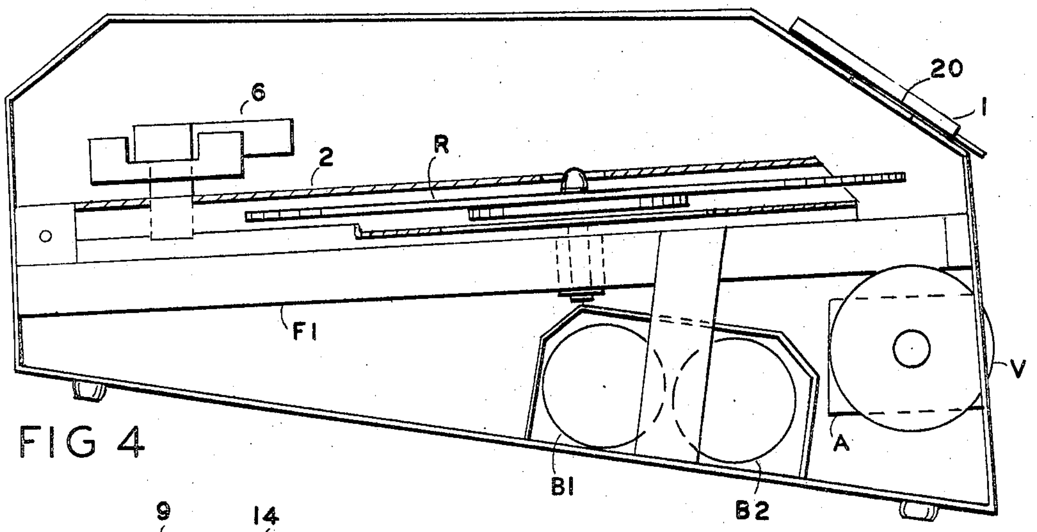
FIGURE 4 is a left side view of FIGURE 3

Raising the flap 1 causes the carriage 2 to be raised through the camming action of 1B and 4 so that the opening in the carriage 2 meets the slot. (FIGS. 4 and 5). When the record is inserted it rests on the bottom of the carriage 2 below pressure wheels 5 and rim drive wheel 8, and tone arm 6, all of which are in the fully down position, due to the action of each of their springs, but not far enough down to interfere with the entry of the record into the carriage 2.

Figure 6:
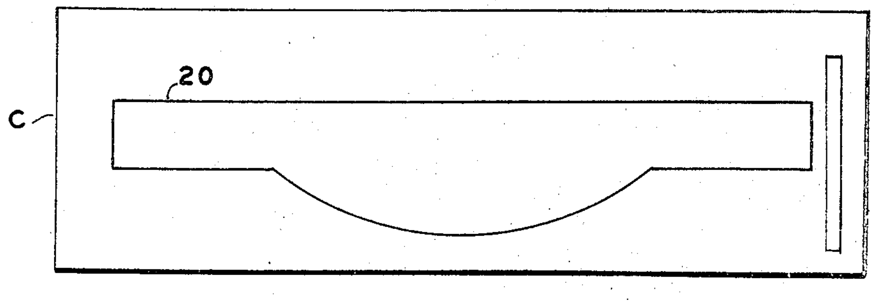
FIGURE 6 is a detailed front view showing the slot for the record.
Figure 3:
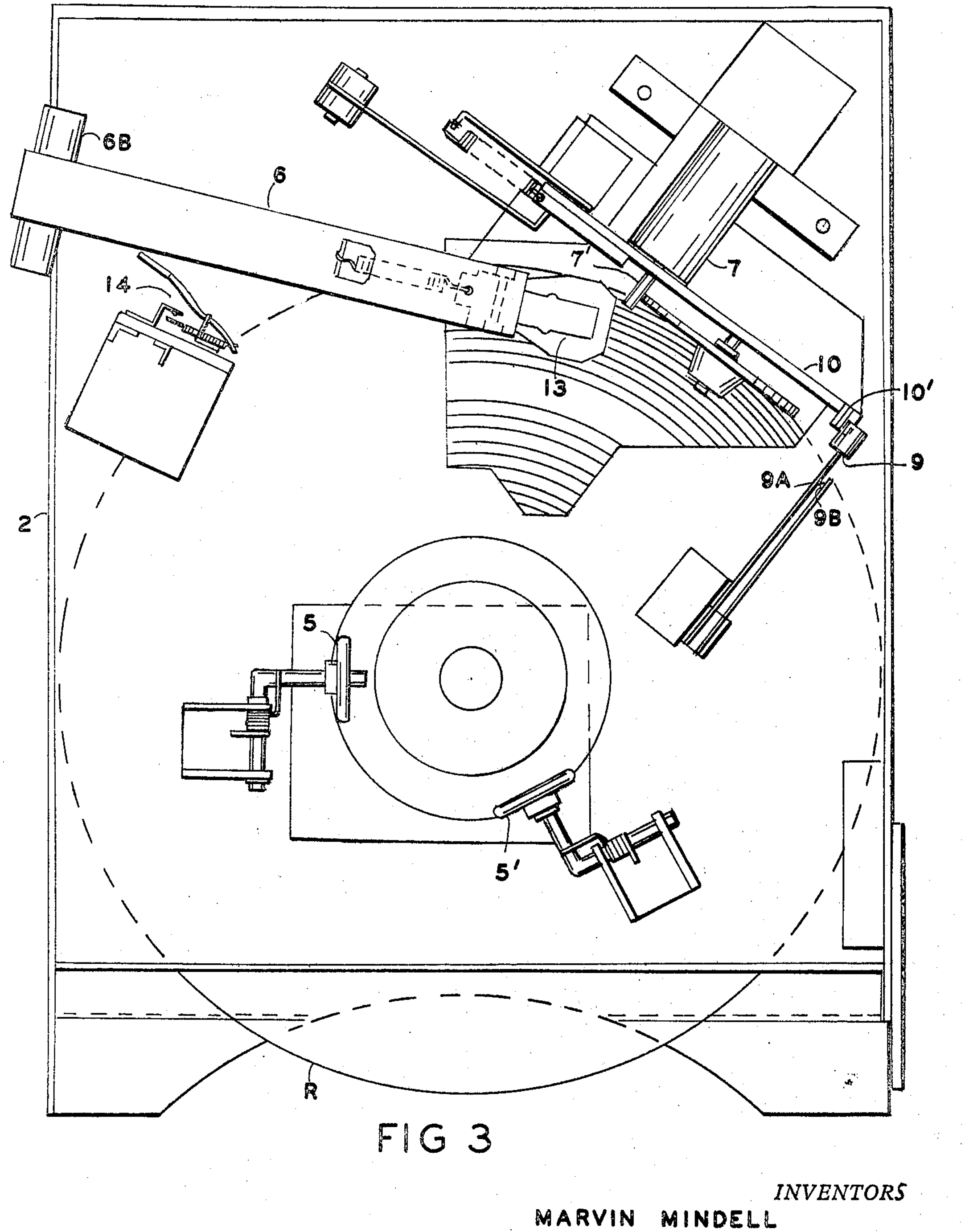
FIGURE 3 is a top view of FIGURE 2.

The carriage dimensions are such that the record is guided in a position which is centered over the spindle 15. Thus closure of the flap 1 FIGURE 6 causes the carriage 2 to rotate down over the spindle 15 bringing it into a horizontal position. Effectively, the record is raised in the carriage 2 by the spindle 15. This causes the pressure wheels 5, the rim drive wheel 8 and the stylus of the tone arm 6 to bear against the record. Since the rim drive wheel 8 is pivotally mounted to the carriage on arm 10 it is caused to rotate upward with respect to the carriage. This rotation brings the pivotally mounted arm 10 into camming contact with switch 9 forcing the leaves of the switch together which completes the circuit to motor 7 causing it to start rotating.

Additionally, rotation of arm 10 causes rim drive wheel 8 to bear not only against the record but also the shaft of motor 7. This action is assisted by springs 12 and 12′ both of which are anchored to bracket 12A. Counterweight 11 tends to remove the effects of position on arm 10.

The record player may be operated in any position. Wheels 5, 5′ load the record against spindle 15 and tone arm 6 is constructed with the end 13 pivoted and spring loaded to minimize the mass of the arm which must be in motion in a plane perpendicular to the record. Tone arm 6 also is constructed with a counter weight 6B at the opposite end to minimize the effects of external shock and position on its operation. Thus it is relatively insensitive to position or motion during operation.

Spindle 15 as faced with a resilient material to provide a firm platform for the record. A bearing is provided for radial end thrust. The record is driven directly by the rim drive wheel 8. The tone arm 6 is guided across the record by the action of the needle in the grooves.

When the arm 6 reaches the end of the record, it bears against switch 14 causing the motor 7 to stop. The device remains in this position until the flap 1 is reopened. When the flap is rotated up, cams 1B and 4 cause the carriage 2 to rotate upward. At the beginning of this action the record is lifted by the bottom of the carriage 2 as it is lifted off the spindle 15. This causes tone arm 6 to lose contact with the record and due to the gravitational force exerted as the carriage 2 is rotated upwardly and the pressure of spring in swich 14, the tone arm 6 rotates back to the start position. The pressure wheels 5 and the rim drive wheel 8 also lose contact clearing the way for removal of the record. Loss of contact with the record also causes the arm 10 to rotate downward with respect to the carriage 2 and thus disengage with switch 9 allowing the contacts to spring apart. The record is then readily removed.

Should the flap 1 be closed with no record in place, the carriage 2 is still rotated downward. The tone arm end 13, pressure wheels 5 and the rim drive wheels 8 are spring loaded to the maximum down position. There is no relative motion between the carriage 2 and the arm 10 and thus no relative upward movement causing arm 10 to cam switch 9. Thus the record player remains off. The spring in switch 14 bearing against tone arm 6 serves to keep tone arm 6 in place. Opening the flap 1 at any time during the time in which the record is playing causes the system to reset.

We claim:

1. A record player comprising a case having a front face, a slot in said front face adapted to receive a record,
 a spindle freely rotatably mounted in said case,
 a carriage pivotally mounted in said case to pivot between up and down positions,
 said spindle being adapted to extend through said carriage when said carriage is pivoted to the down position,
 a control lever pivotally mounted on said case to move between first up and second down positions,
 means to connect said control lever to said carriage to pivot said carriage up when said lever is raised to the first up position, and to pivot said carriage down when said lever is lowered to the second down position,
 said carriage being adapted to receive a record inserted through said slot when said carriage is in the up position, whereby when said control lever is lowered said carriage is pivoted down to deposit said record on said spindle,
 a control arm pivotally mounted on said carriage,
 a rim drive wheel rotatably mounted on said control arm to bear on the rim of a record in said carriage when said carriage is pivoted to the down position,
 a motor and motor shaft mounted on said carriage, said motor shaft being adapted to connect with said rim drive wheel,
 a cam mounted on said control arm,
 a motor start switch mounted in said case and adapted to be controlled by said cam to start said motor when said carriage causes said rim wheel to bear on said record.

2. Apparatus as in claim 1 wherein said control lever is a flap adapted to cover said slot.

3. Apparatus as in claim 1 having a tone arm rotatably mounted on said carriage, said tone arm having a pickup adapted to contact the grooves of said record,
 a motor stop switch mounted on said case and adapted to be actuated by said tone arm when said tone arm is rotated by said grooves to the center of said record.

4. Apparatus as in claim 3 having a disclike extension of said spindle for supporting said record, a pair of pressure wheels mounted on said carriage whereby when said carriage is pivoted to the down position, the record is gripped between said disclike extension of said spindle and said pressure wheels, and said record bears against and is driven by said rim drive wheel, whereby said record may be played when said case is held in any position.

5. Apparatus as in claim 3 wherein said tone arm is mounted and spring loaded on said carriage in such manner that when said carriage is returned to the up position said tone arm is rotated by gravity to return to a start position on a record.

6. Apparatus as in claim 4 wherein said pressure wheels and said rim wheel are arranged to contact the record on said spindle in such a manner so as to provide drive and support.

References Cited

UNITED STATES PATENTS

| | | | |
|---|---|---|---|
| 3,256,024 | 6/1966 | Mason | 274—9 |
| 2,927,794 | 3/1960 | Carson | 274—9.2 |

FOREIGN PATENTS

| | | |
|---|---|---|
| 1,230,589 | 12/1966 | Germany. |
| 1,128,165 | 4/1962 | Germany. |
| 966,791 | 9/1957 | Germany. |

LEONARD FORMAN, Primary Examiner

ROGER A. FIELDS, Assistant Examiner

U.S. Cl. X.R.

274—39